United States Patent
Cipolla et al.

(10) Patent No.: US 10,753,456 B2
(45) Date of Patent: Aug. 25, 2020

(54) OIL TRANSFER UNIT FOR TRANSFERRING OIL BETWEEN A STATIONARY PART AND A ROTATING PART

(71) Applicant: GE Avio S.r.l., Rivalta di Torino (IT)

(72) Inventors: Lorenzo Cipolla, Rivalta di Torino (IT); Michele Gravina, Rivalta di Torino (IT)

(73) Assignee: GE Avio S.r.l., Rivalta di Torino (IT)

( * ) Notice: Subject to any disclaimer, the term of this patent is extended or adjusted under 35 U.S.C. 154(b) by 322 days.

(21) Appl. No.: 15/492,045

(22) Filed: Apr. 20, 2017

(65) Prior Publication Data

US 2017/0307062 A1    Oct. 26, 2017

(30) Foreign Application Priority Data

Apr. 20, 2016   (IT) .................. 102016000040539

(51) Int. Cl.
  *F16H 57/04*    (2010.01)
  *F02C 7/36*    (2006.01)
  (Continued)

(52) U.S. Cl.
  CPC ....... *F16H 57/0424* (2013.01); *F01D 25/166* (2013.01); *F01D 25/18* (2013.01);
  (Continued)

(58) Field of Classification Search
  CPC ........ F16J 15/164; F16J 15/441; F16J 15/443; F16H 57/0424; F16H 57/0427;
  (Continued)

(56) References Cited

U.S. PATENT DOCUMENTS 2,598,381 A * 5/1952 Hoffman ............... F16J 15/164
  277/429
2,964,339 A * 12/1960 Macks ................... F16J 15/441
  277/422

(Continued)

FOREIGN PATENT DOCUMENTS

CN    2177096 Y    9/1994
EP    0 333 692 A2    9/1989
  (Continued)

OTHER PUBLICATIONS

Search Report and Written Opinion issued in connection with corresponding IT Application No. 102016000040539 dated Jan. 10, 2017.
  (Continued)

*Primary Examiner* — Minh Truong
(74) *Attorney, Agent, or Firm* — Dority & Manning, P.A.

(57) ABSTRACT

An oil transfer unit has a rotating part extending along an axis, a stationary part provided with an oil mouth, and a floating part coupled to the stationary part; the floating part is provided with a cylindrical surface fitted onto an outer cylindrical surface of the rotating part in a non-contact configuration, with an annular groove therebetween to put the oil mouth into communication with an inner chamber of the rotating part; both sides of the groove are sealed by oil films at a radial gap between the cylindrical surfaces of the floating and rotating parts; the unit has a plurality of recesses, which are delimited outwardly by the floating part and inwardly by the rotating part, are arranged on the opposite axial sides of the groove so as to locally enlarge the radial distance with respect to the radial gap and are inwardly closed by the rotating part.

20 Claims, 6 Drawing Sheets

(51) Int. Cl.
*F02C 7/06* (2006.01)
*F01D 25/16* (2006.01)
*F01D 25/18* (2006.01)

(52) U.S. Cl.
CPC .................. *F02C 7/06* (2013.01); *F02C 7/36* (2013.01); *F16H 57/043* (2013.01); *F16H 57/0479* (2013.01)

(58) Field of Classification Search
CPC .. F16H 57/0432; F01D 25/166; F01D 25/183; F16C 33/6685
See application file for complete search history.

(56) References Cited

U.S. PATENT DOCUMENTS

| | | | | |
|---|---|---|---|---|
| 3,047,299 | A * | 7/1962 | Karsten | F16J 15/40 277/422 |
| 4,044,561 | A * | 8/1977 | Hohn | F01D 25/166 60/657 |
| 4,199,152 | A * | 4/1980 | Catterfeld | F04D 29/106 277/422 |
| 4,334,720 | A * | 6/1982 | Signer | F16C 33/60 384/475 |
| 4,815,748 | A * | 3/1989 | Schubert | F16J 15/441 277/422 |
| 5,492,506 | A | 2/1996 | Lorance | |
| 6,223,616 | B1 | 5/2001 | Sheridan | |
| 7,178,987 | B2 * | 2/2007 | Bridges | F01D 25/16 384/465 |
| 8,813,469 | B2 | 8/2014 | Sheridan | |
| 9,841,056 | B2 * | 12/2017 | Snow | F01D 25/162 |
| 2006/0062504 | A1 * | 3/2006 | Wilton | F01D 25/18 384/475 |
| 2008/0098735 | A1 * | 5/2008 | Gutknecht | F01D 25/166 60/605.3 |
| 2013/0108483 | A1 * | 5/2013 | Becker | F01D 25/166 417/313 |
| 2014/0086731 | A1 * | 3/2014 | Schmidt | F01D 25/125 415/170.1 |
| 2014/0126992 | A1 * | 5/2014 | Morreale | F01D 25/16 415/1 |
| 2018/0023620 | A1 * | 1/2018 | Berger | F16C 17/10 384/107 |
| 2018/0172139 | A1 * | 6/2018 | Yamamoto | F16J 15/447 |

FOREIGN PATENT DOCUMENTS

| | | |
|---|---|---|
| EP | 1 460 309 A2 | 9/2004 |
| GB | 2 234 035 A | 1/1991 |
| WO | 03/078869 A1 | 9/2003 |

OTHER PUBLICATIONS

Extended European Search Report and Opinion issued in connection with corresponding EP Application No. 17167329.6 dated Aug. 21, 2017.
Machine Translation and First Office Action and search issued in connection with corresponding CN Application No. 201710261057.0 dated Dec. 20, 2018.
Canadian Office Action Corresponding to CA Application No. 2963520 dated May 9, 2018.

* cited by examiner

OIL TRANSFER UNIT FOR TRANSFERRING OIL BETWEEN A STATIONARY PART AND A ROTATING PART

BACKGROUND TO THE INVENTION

The present invention relates to an oil transfer unit for transferring oil between a stationary part and a rotating part. In particular, the following description will refer to an oil transfer unit for supplying lubricating oil to a rotating planet carrier of an epicyclic transmission in a turbine engine, but without losing in generality because of this explicit reference.

As is known, an epicyclic transmission comprises a sun gear, a ring gear and a plurality of planet gears, which are located between the sun gear and the ring gear and are supported by a carrier. A transmission of such a type is capable of transmitting the motion between coaxial shafts rotating at different speeds, and is very effective in providing such a function while maintaining small weight and volumes. Epicyclic transmissions are widely used in aeronautical turbine engines, to drive a fan (in so-called turbo-fan engines) or a propeller (in so-called turbo-propeller engines).

BRIEF DESCRIPTION OF THE INVENTION

In most applications, the carrier is of static type and is coupled to a fixed frame of the engine by a flexible element. Under these conditions, the components supported by the carrier (the planet gears, possible rolling bearings, etc.) are lubricated without particular difficulty via ducts which are fixed with respect to the engine frame and to the carrier.

On the other hand, certain applications employ a rotating carrier, by way of example when the carrier is connected to a rotating driven shaft or when there is a need to continuously control the speed ratio between the sun gear and the ring gear or, alternatively, between the carrier and the ring gear. In particular, the configuration of the epicyclic transmission is called "planetary" when the ring gear is stationary and the carrier is rotating, and "differential" when all three elements, i.e. sun gear, ring gear and carrier, are rotating.

In these cases, an oil transfer unit is generally provided to transfer the lubricant oil in an efficient and reliable manner from a static part to a rotating part connected to the carrier. Such oil transfer units are generally known as "oil transfer bearings" or as "rotary unions". In particular, the unit supplies oil under pressure into an annular chamber defined by a sleeve which is fixed to the carrier. From such annular chamber, the pressurized oil flows towards the components requiring lubrication.

The outer cylindrical surface of the sleeve has a radial passage arranged at the same axial position of the annular channel so as to put such channel into communication with the inner annular chamber. A minimum radial gap is provided between the inner cylindrical surfaces of the bearing and the outer cylindrical surface of the sleeve, to allow rotation of the sleeve and, in the meantime, to define a seal.

The amount of such radial gap is accurately determined in the design stage, so as to minimize leakages and therefore maximize the volumetric efficiency for the transfer of the oil. In the meantime, the mating cylindrical surfaces of the bearing and the sleeve have to be machined with a high precision level, to ensure the radial gap that has been defined at the design stage.

However, instable operating conditions can occur for the oil film at the radial gap between the above mentioned cylindrical surfaces. Such instable operating conditions alter the design setting established for the radial gap.

In particular, the radial width of the oil film between the cylindrical surfaces can decrease until reaching a zero value, so that a contact occurs between such cylindrical surfaces, while the latter are moving one with respect to the other. These possible contacts are a severe source of wear and can even cause seizing of the bearing onto the sleeve.

These undesired phenomena are more likely and particularly relevant when the radial loads on the bearing are relatively low and/or when there is a relatively low ratio between axial size and diameter of the cylindrical surface of the bearing. Indeed, in this case, the dampening capability of the oil film at the radial gap is relatively low.

Therefore, a need is felt to improve the oil transfer units of known type, in order to have a higher stability of the operating conditions of the oil film at the seals in the above mentioned radial gap, so as to limit the risk of contacts between the outer bearing and the inner rotating sleeve during operation.

It is an object of embodiments of the present invention to provide an oil transfer unit for transferring oil between a stationary part and a rotating part, which allows to meet the above mentioned need in a simple and cost-effective manner.

According to embodiments of the present invention, an oil transfer unit for transferring oil between a stationary part and a rotating part is provided.

BRIEF DESCRIPTION OF THE DRAWINGS

Embodiments of the present invention will now be described with reference to the accompanying drawings, which show a non-limiting embodiment thereof, in which.

Figure 1:
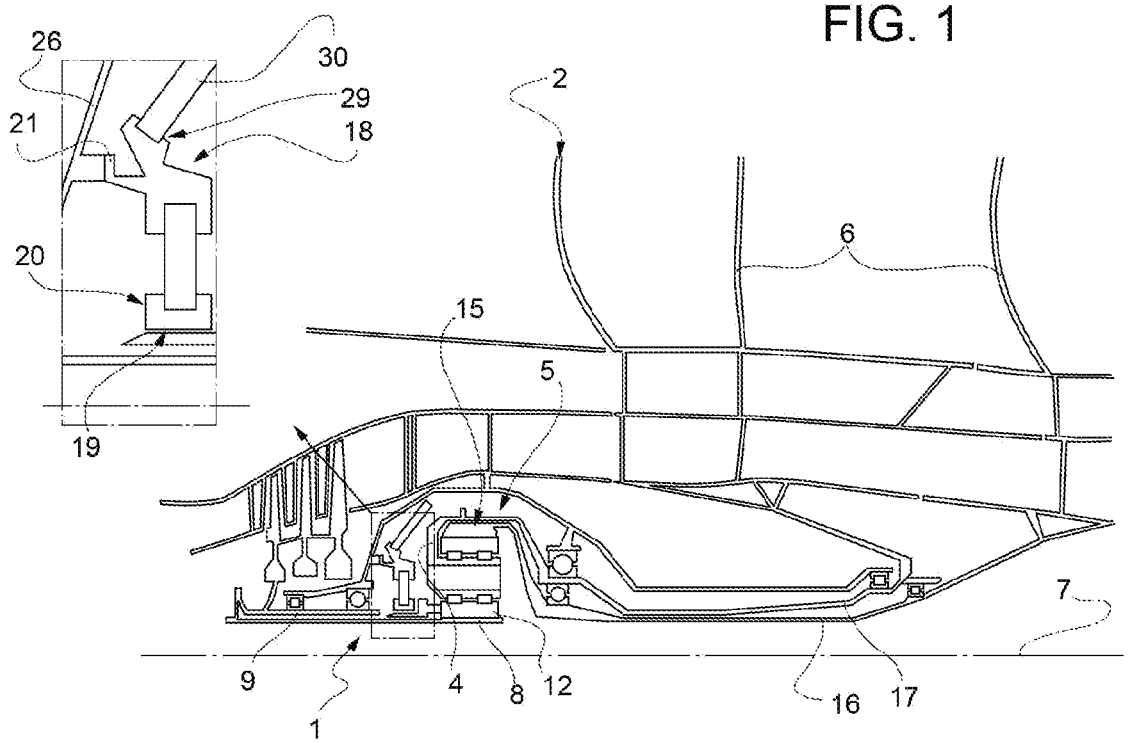
FIG. 1 is a diagram corresponding to a partial cross-section of a turbine engine, which includes an embodiment of the oil transfer unit for transferring oil between a stationary part and a rotating part, according to an embodiment of the present invention.

With reference to the diagram of FIG. 1, reference numeral 1 indicates an oil transfer unit for transferring oil between a stationary part and a rotating part. In this embodiment, unit 1 is mounted in a turbine engine 2 (partially and diagrammatically shown) and is used to supply lubricating oil towards a rotating planet carrier 4 defining part of an epicyclic transmission 5. In particular, the engine 2 shown in FIG. 1 is of the kind commonly known as "open rotor" and comprises two propellers 6 rotating in opposite directions about an axis 7.

Transmission 5 comprises a sun gear 8, which is rotational about axis 7 and is connected to an input shaft 9 so as to be driven by a turbine; a plurality of planet gears 12, which mesh with the sun gear 8, are supported by the carrier 4 and are rotational about respective axes, parallel and eccentric with respect to axis 7; and a ring gear 15, coaxial with the sun gear 8 and meshing with the planet gears 12 on the outer side.

Ring gear 15 and carrier 4 are connected in an angularly fixed manner to respective output members 16 and 17, which are coaxial with shaft 9 and drive corresponding propellers 6.

The particular differential configuration that has just been described for the epicyclic transmission 5 and the particular open rotor configuration that has been indicated for the engine 2 do not exclude the use of unit 1 according to embodiments of the present invention for other kinds of epicyclic transmissions and/or engines, or for other kind of devices that need an oil supply. By way of example, unit 1 can be used to supply oil to rotating hydraulic actuators or systems, in particular to actuators controlled to adjust the pitch angle of the propeller blades (commonly known as PCM, i.e. pitch control mechanisms).

With reference to the diagrammatic enlarged view shown in FIG. 1, unit 1 comprises a stationary part 18, fixed with respect to a supporting structure of the engine 2; a rotating part 19, coaxial and angularly fixed with respect to the carrier 4; and a non-rotating floating part 20 which is configured so as to transfer oil from part 18 to part 19 and to have a certain degree of freedom in its movements with respect to part 18, as it will be described below in more detail.

As far as the support of part 18 is concerned, in an embodiment the latter is directly fixed to a so-called mid static frame 26, supporting the shaft 9 and the output members 16 and 17 by means of rolling bearings. In particular, part 18 comprises one or more flanges 21 bolted to frame 26.

Part 18 has an inner annular channel 28 (FIG. 8) and one or more inlet mouths 29, which receive pressurized oil from a hydraulic system 30 of the engine 2 and permanently communicate with channel 28 for supplying oil into such channel 28.

Figure 8:
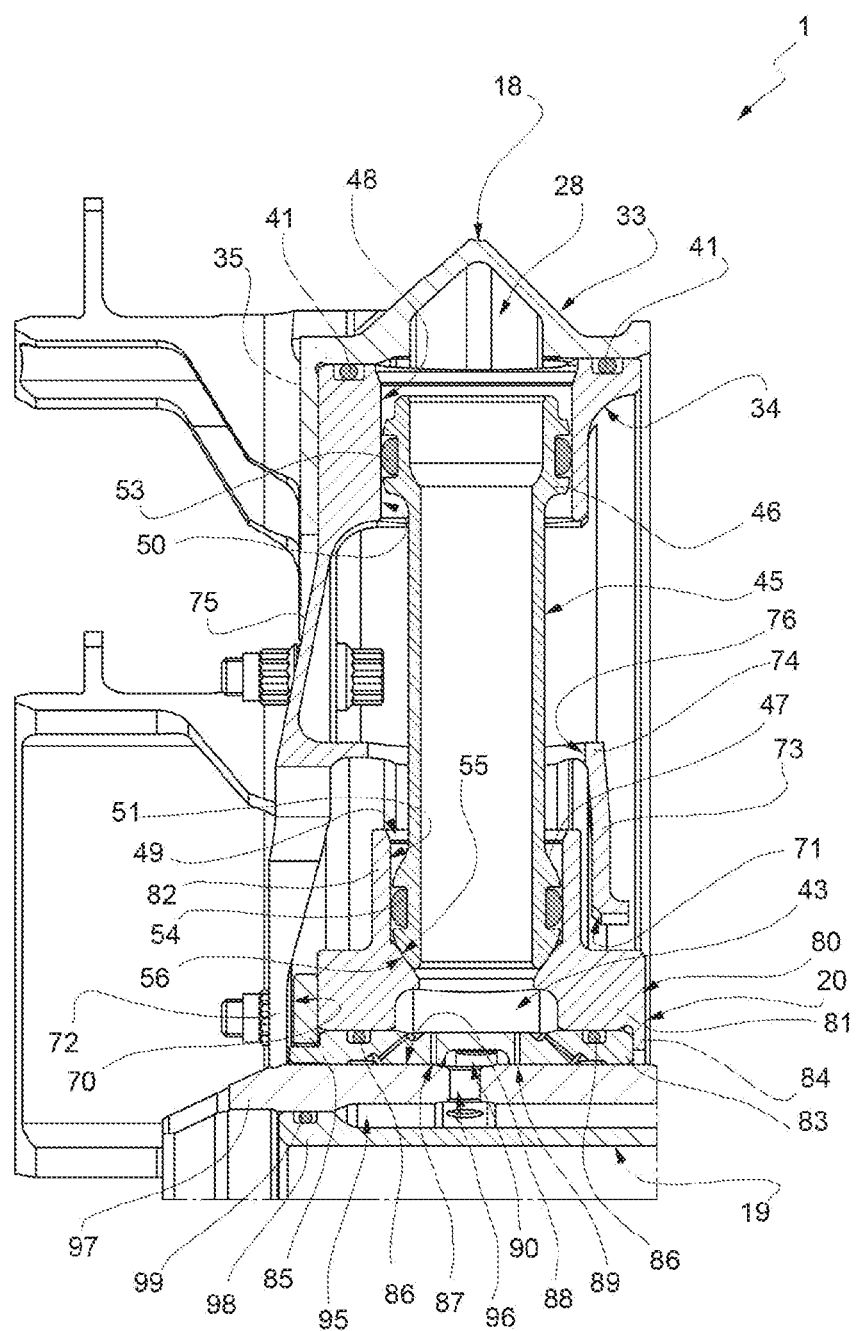
FIG. 8 is a cross-section, in an enlarged scale, according to the sectional plane VIII-VIII in FIG. 2.

With reference to FIG. 8, in an embodiment, part 18 comprises two annular elements 33 and 34, which are fixed to each other and are arranged respectively in a outer position and in an inner position with respect to axis 7. In particular, elements 33,34 comprise respective flanges 35 (FIG. 5) and 36 (FIG. 4), that are transversal to axis 7, axially rest against each other and are bolted to each other. As shown in FIG. 5, flanges 21 define parts of respective projections 37, that in some embodiments protrude from flange 35 and are made in one piece with element 33. Besides, in particular, inlet mouths 29 are also defined by projections 38, that radially and outwardly protrude from element 33 and are made in one piece with element 33.

As shown in FIG. 8, elements 33 and 34 are coupled to each other by means of sealing rings 41, that are arranged on opposite axial sides of channel 28 to ensure fluid-tightness. Anyway, other kinds of construction (not shown) could be provided to define part 18. By way of example, part 18 could be manufactured in one piece by means of additive manufacturing techniques.

Channel 28 permanently communicates with an annular channel 43 of part 20 via one or more oil transfer tubes 45, each radially ending with two opposite heads 46,47. Head 46 is coupled in a fluid-tight manner to element 34, while head 47 is coupled in a fluid-tight manner to part 20. Heads 46 and 47 engage respective cylindrical seats 48 and 49 having respective cylindrical surfaces 50 and 51.

Figure 4:
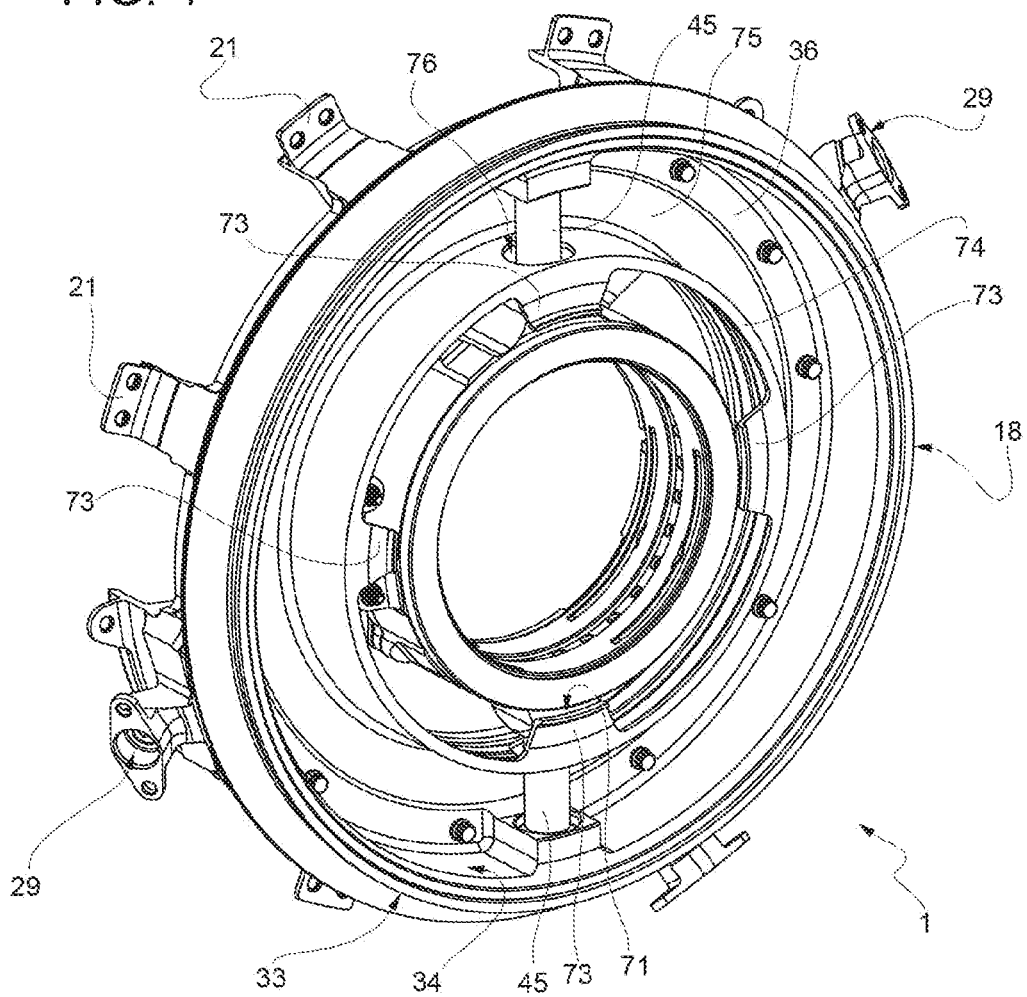
FIGS. 4 and 5 are different perspective views, at different scales, of other parts of the oil transfer unit.
Figure 5:
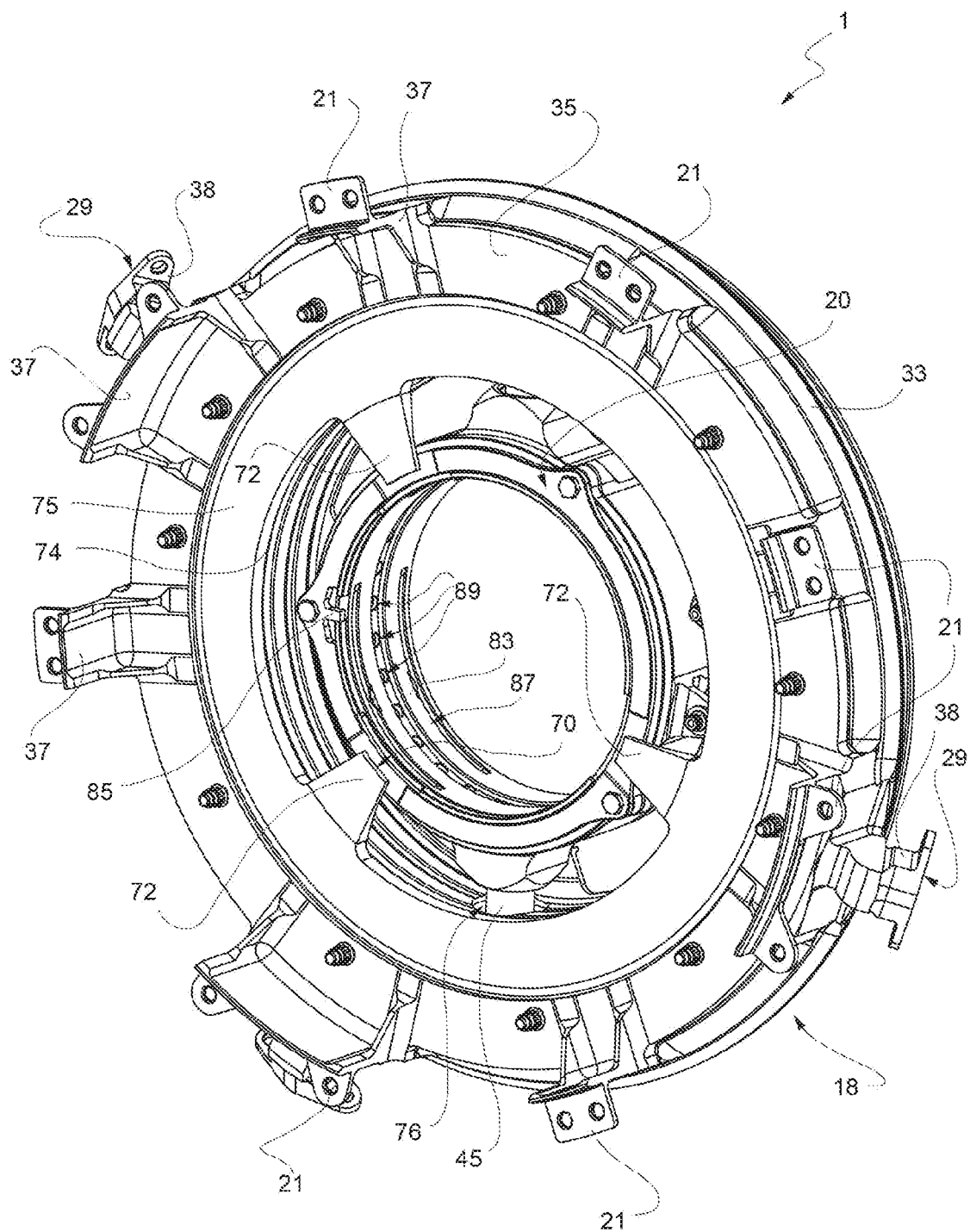

In some embodiments, as shown in FIG. 4, unit 1 comprises only two tubes 45, arranged in diametrical opposite positions with respect to axis 7.

With reference again to FIG. 8, the outer side surfaces of heads 46 and 47 are coupled to the inner surfaces 50 and 51 by means of respective sealing rings 53,54 and in such a manner to give freedom for the tube 45 to slide along the axes of the seats 48,49. In addition, the outer side surfaces of heads 46 and 47 have respective diameters that are lower than the inner diameters of surfaces 50 and 51, so as to leave an annular gap between the heads 46,47 and the surfaces 50 and 51, in radial direction with respect to the axes of seats 48 and 49. Such gaps are closed by the sealing rings 53,54 and allow the tube 45 for a certain degree of freedom in rotation about a tangential direction with respect to parts 18 and 20.

The freedom of movements given to the tubes 45 allows the part 20 to float with respect to part 18, but does not compromise the sealing at the seats 48 and 49, as the sealing rings 53 and 54 elastically deform during such movements and continue to be in contact with surfaces 50,51.

According to an aspect of unit 1, the diameter of surface 50 is different from, in an embodiment higher than, the diameter of surface 51. Thanks to the oil pressure in the channels 28 and 43 and in the tubes 45, this difference in diameter generates a thrust on the tubes 45 towards part 20 and axis 7. In the meantime, seat 49 has a surface 55, joined to surface 51 and defining a stop shoulder for an end surface 56 of the head 47, which therefore permanently rests onto surface 55. The shapes of surfaces 55 and 56 are designed so as to define a contact at a circular theoretical line, for allowing rotation for the head 47 about the tangential direction with respect to part 20. By way of example, surface 55 is shaped as conical, and surface 56 is shaped as a spherical surface having a center that is arranged on the axis of tube 45. In an embodiment, along the axis of the tube 45, such center is arranged at the mid-plane of the sealing ring 54, in order to minimize the reaction moment, generated by the elastic deformation of the seal, in presence of a misalignment of the tube 45 with respect to the floating part 20.

In an embodiment, sealing rings 53 and 54 define respective so-called dynamic seals, which are designed so as to avoid leakage from tubes 45 when there is a strong misalignment and to have high resistance with respect to the continuous sliding on the inner surface of the tubes 45 in dynamic conditions.

Figure 2:
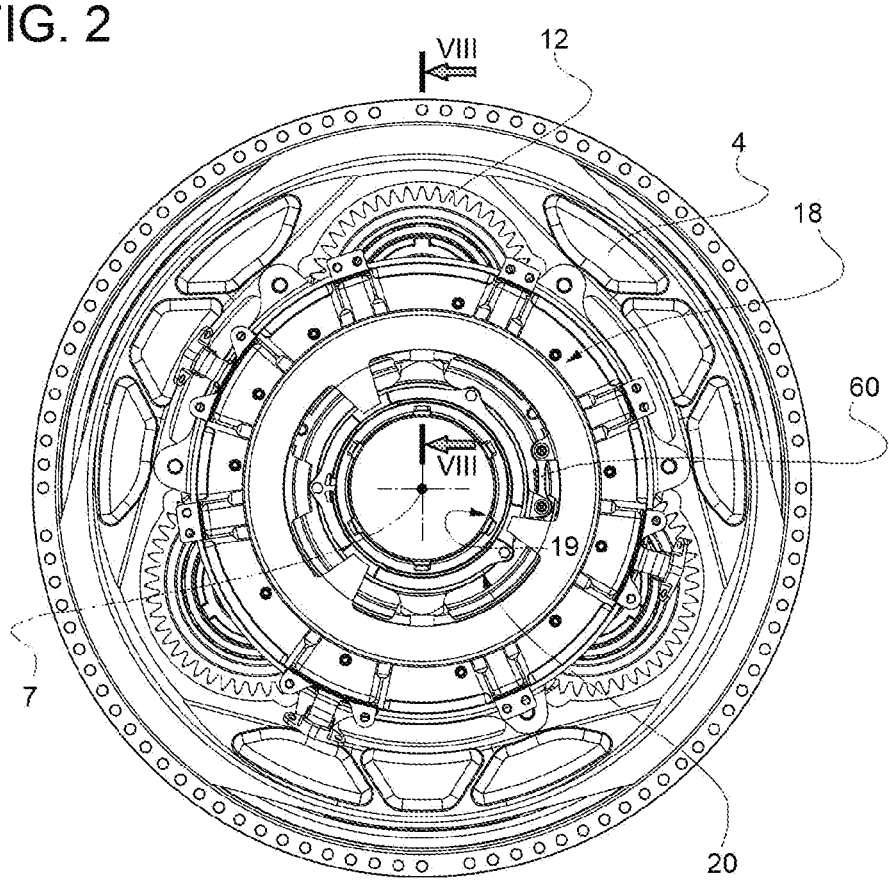
FIG. 2 is a front view of the oil transfer unit in FIG. 1.
Figure 6:
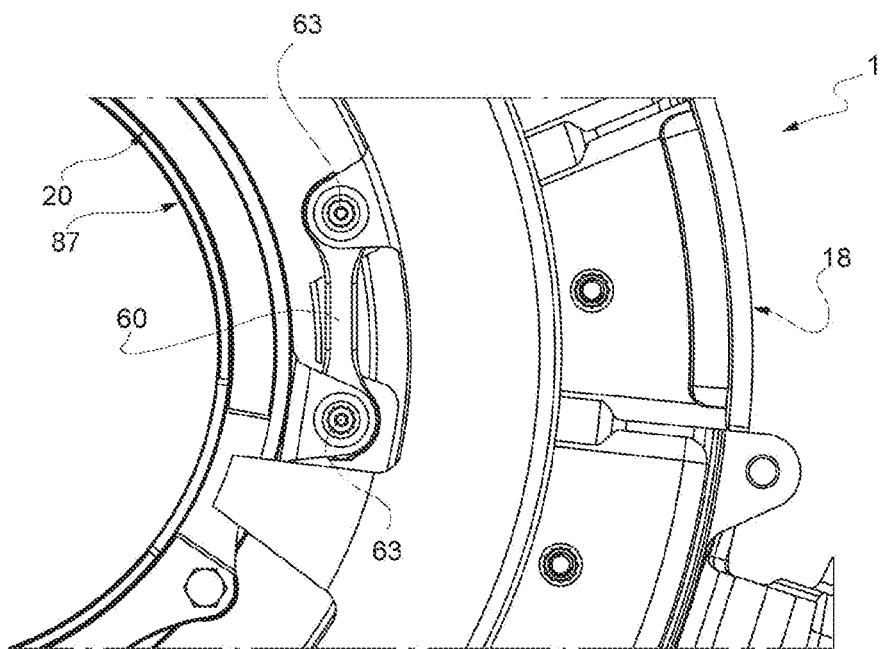
FIG. 6 shows a detail of FIG. 2, in an enlarged scale and with elements removed for sake of clarity.

In an embodiment, the shape of the outer profile in cross-section of the sealing rings 53 and 54 is trapezoidal or a D-shape, so as to avoid rubber seal spiral mode failures and rubber extrusion during the relative motion. Secondary, the above shape helps in obtaining an easier rotation of the heads 46,47. As shown in FIGS. 2 and 6, rotation of part 20 about axis 7 is prevented by a connecting rod 60 having a rectilinear axis which extends in a tangential direction with respect to axis 7 when part 20 is arranged in a design reference position with respect to part 18.

In an embodiment, the axis of the connecting rod 60 is arranged parallel to the tubes 45. This orientation allows to minimize the amplitude of the sliding and rotation movements of the heads 46,47 in the respective seats 48,49, for a given floating movement of part 20, so as to minimize the displacement and misalignment of the tubes 45 and, therefore, to minimize the risk of extrusion of the rubber seals (53 and 54).

The connecting rod 60 can be made of different pieces, fixed to each other, or can be made as a single piece. In an embodiment, the connecting rod 60 has two opposite ends, which are connected to part 18 and 20 by respective spherical joints 63. The provision of a spherical joint 63 at each end of the connecting rod 60 ensures a degree of freedom in axial translation for the part 20, with respect to axis 7, and not only a degree of freedom in rotation.

As an aspect of an embodiment of the present invention, with reference to FIGS. 4 and 5, the floating movement of part 20 is limited under a given range, established during the design stage, by the provision of shoulders 70,71 which are fixed with respect to part 18, are arranged on opposite axial sides of part 20 and axially face part 20. In an embodiment, shoulder 71 also radially faces part 20 (as it can be seen in FIG. 8).

Shoulders 70,71 are defined by respective series of tabs 72 and 73, which are spaced apart from each other about axis 7. In an embodiment, the angular positions of the tabs 72 are staggered with respect to the angular positions of the tabs 73 about axis 7.

In an embodiment, tabs 72 and 73 project radially inward from opposite edges of a tubular ring 74, defining part of element 34. One of such edges is joined outwardly to flange 36 by an intermediate annular wall 75, in order to support the tabs 72,73. For each tube 45, the ring 74 has a corresponding radial passage 76 engaged by such tube 45.

When part 20 is arranged in the design reference position with respect to part 18, an axial gap and a radial gap are provided between the shoulders 70,71 and the part 20, so as to allow the desired floating movements established during the design stage and, therefore, to ensure the optimal operating condition of the unit 1. During assembly of unit 1, on the other hand, shoulders 70,71 can come into contact with part 20, radially and/or axially, so as to limit the relative movements between parts 18 and 20. In this way, the assembly of the unit parts and the mounting of unit 1 in the engine 2 are easier and safer, without risk of damages.

According to what shown as an embodiment in FIG. 8, part 20 comprises a main body 80, which in turn comprises an annular portion 81 defining the outer surface of channel 43; and, for each tube 45, a corresponding outer radial projection 82 defining seat 49. In particular, each of the projections 82 axially faces a corresponding tab 73.

Part 20 further comprises a bushing or annular pad 83, in an embodiment defined by a piece distinct and fixed with respect to body 80. In particular, pad 83 is axially sandwiched between a radial projection 84 of body 80 and a retaining ring 85, which axially rests onto, and is fixed to, body 80 on the opposite axial side of projection 84.

Pad 83 defines an inner surface of channel 43 and is coupled to body 80 by means of sealing rings 86 arranged on opposite axial sides of channel 43 to ensure fluid-tightness.

Pad 83 has a cylindrical surfaces 87 which directly faces and is fitted onto an outer cylindrical surface 88 of part 19 with a radial gap in a non-contact configuration, i.e. without any additional contact sealing element and any contact bearing therebetween. Pad 83 has one or more radial holes 89, putting channel 43 permanently into communication with an annular groove 90, which is delimited outwardly by the pad 83 and inwardly by the part 19 and axially splits surface 87 and/or surface 88 into two separated zones.

The size of the radial gap between surfaces 87,88 is defined during the design stage so as to allow rotation of part 19 and, in the meantime, define a hydrostatic seal with an oil film on each side of the groove 90 between surfaces 87,88 (i.e. at each of the two separated zones of the surfaces 87,88). Surfaces 87,88 have to be machined with a high level of precision and low tolerances in order to ensure both the rotation and the sealing conditions that have been defined during the design stage.

Figure 7:
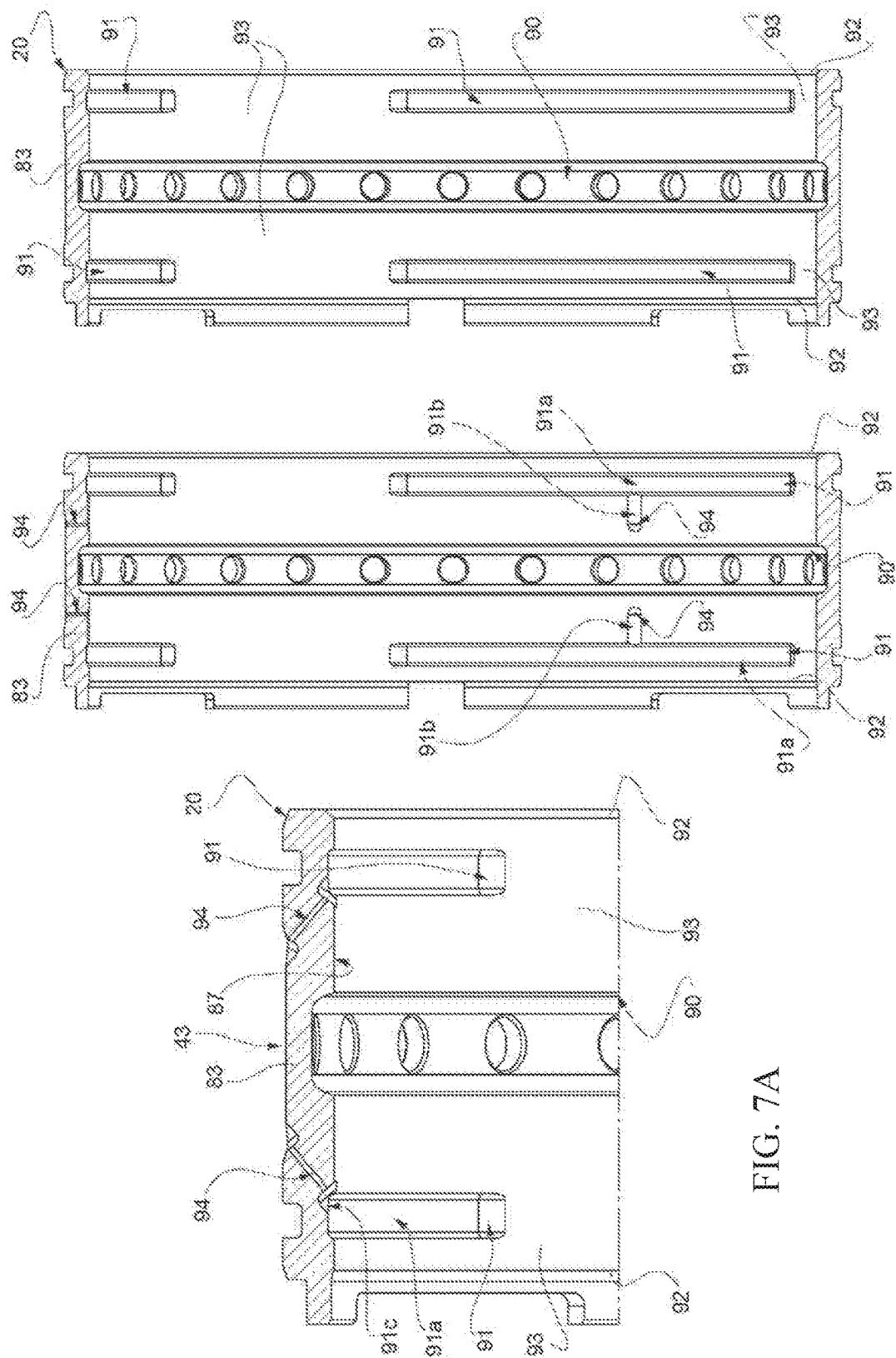
FIG. 7A shows a detail of a part of the transfer unit according to the present invention, in an enlarged scale and in cross-section according to the sectional plane VIII-VIII in FIG. 2.
FIGS. 7B and 7C show respective variants of the part in FIG. 7A, in a different scale.

With reference to FIG. 7A, according to an aspect of embodiments of the present invention, unit 1 has a plurality of recesses 91, which are delimited outwardly by the pad 83 and inwardly by the part 19, are arranged on opposite axial sides of the groove 90 and are axially spaced apart from the groove 90 and from the outer end circular edges 92 of surface 87.

It is evident from the drawings that recesses 91 suddenly and locally enlarge the radial distance between the pad 83 and the part 19, with respect to the size of the radial gap, so as to define respective oil housings or oil pits, that interrupt or alter the radial gap between surfaces 87,88 in appropriate zones that are defined during the design stage.

The recesses 91 are inwardly closed by the part 19, so that there is no way out for the oil housed in the recesses 91 apart from the circular exits at the edges 92. The greater amount of oil housed in the recesses 91 alter the pressure distribution in the oil film, either in axial direction or in the circumferential direction.

Such alteration helps in reducing the amount of oil leakage coming out of edges 92, on the one hand, and in bearing the part 20 during rotation of the part 19, on the other hand. In particular, such alteration helps in increasing the stability of the seal, as it limits the risks of contacts between surfaces 87 and 88 during operation.

In an embodiment, recesses 91 are symmetric with respect to a mid-plane of the groove 90, so as to have a symmetric behavior of the seal function and the bearing function performed by the oil enclosed between surfaces 87,88. In particular, recesses 91 are aligned along two annular rows that are symmetric with respect to the groove 90.

In an embodiment, along each row, i.e. on each side of the groove 90, the corresponding recesses 91 are angularly spaced apart from each other, so as to maintain the continuity of the defined radial gap between surfaces 87,88 from the groove 90 until the corresponding edge 92, at some sectors 93 (FIG. 7C) that are alternate to the recesses 91 about axis 7. In particular, along each row, the recesses 91 are equally spaced.

According to an embodiment that is shown in the attached drawings, recesses 91 are radially defined outwardly by respective pockets made into the surface 87 of the pad 83 and inwardly by the cylindrical surface 88 of part 19. This arrangement is advantageous because of it is easier to be manufactured and allows for easily supplying oil into the recesses 91, as in the embodiments of FIGS. 7A and 7B. As an alternative or in combination with this configuration, recesses 91 may be defined by pockets (not shown) made into the surface 88.

According to the embodiments of FIGS. 7A and 7B, as mentioned above, recesses 91 are supplied with pressurized oil from channel 43 through passages 94 made in the pad 83, so as to increase the back pressure of the oil housed in the recesses 91, with respect to the solution shown in FIG. 7C, where no passages 94 are provided. In general, passages 94 have a calibrated cross-section and define elements that passively control the bearing function by generating appropriate conditions for the hydrostatic bearing.

In the embodiment of FIG. 7B, the recesses 91 comprise respective arc portions 91*a*, elongated along a circumferential direction about axis 7, and respective axial branches 91*b*, which axially extend from portions 91*a* towards groove 90. In the meantime, the passages 94 are defined by respective holes which are radial and open into the axial branches 91*b*.

In the embodiment of FIG. 7A, on the other hand, the recesses 91 comprise respective arc portions 91a, elongated along a circumferential direction about axis 7, and respective recesses 91c, made on the axial side towards groove 90. In the meantime, the passages 94 are defined by holes which are inclined with respect to the radial and axial directions and open into the recesses 91c.

The embodiment of FIG. 7B, with purely radial holes, is in an embodiment preferable for the manufacturing techniques.

The embodiment of FIG. 7A, on the other hand, is in an embodiment preferable for the bearing function, because the oil supplied by the inclined holes has less interactions with the oil film.

The embodiment of FIG. 7C allows for less oil leakage, in relation to the embodiments of FIGS. 7A and 7B, and does not have possible drawbacks due to the manufacturing of the passages 94 (e.g. possible debris that can be released and flow into the oil film during operation).

With reference to FIG. 8, part 19 has an inner annular chamber 95 and one or more radial holes 96, which are arranged at the same axial position of the groove 90 and put chamber 95 permanently into communication with the groove 90. Chamber 95, in turn, permanently communicates with one or more outlets (not shown) to supply oil to such outlets and, therefore, lubricate the gear meshes and/or the planet bearings.

In particular, chamber 95 is defined by an outer sleeve 97 and an inner sleeve 98, which are coupled to each other by means of sealing rings 99 (FIG. 8) to ensure fluid-tightness. By way of example, sleeves 97,98 are fixed to each other by screws (not shown).

Figure 3:
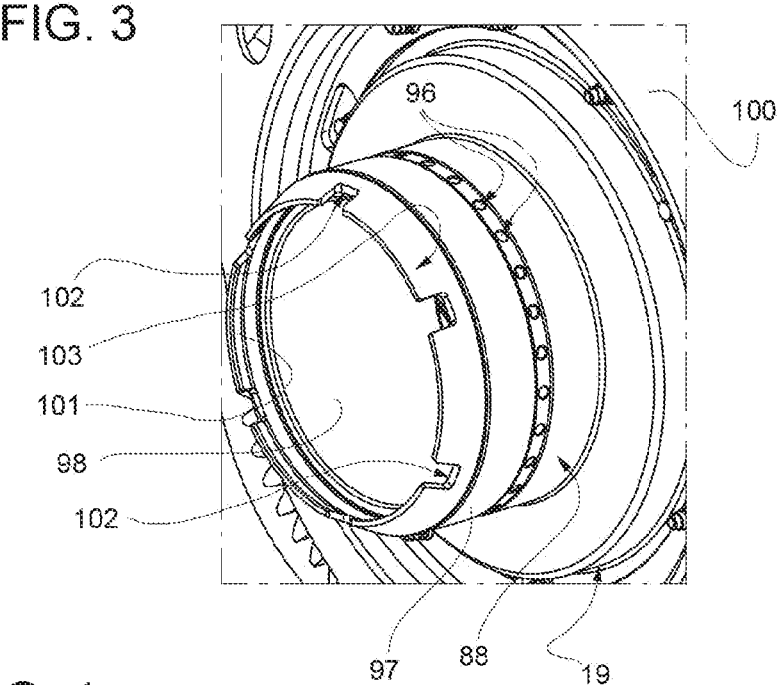
FIG. 3 shows, in a perspective view and in an enlarged scale, a rotating part of the oil transfer unit in FIG. 1.

As partially shown in FIG. 3, part 19 is fixed to the carrier 4 and, in particular, comprises a disk member 100 connecting sleeve 97 to a front surface of carrier 4. On the axial side opposite to member 100, part 19 ends with a front portion 101 having a plurality of axial notches 102, which start from the edge of portion 101, are angularly spaced along such edge and have the function of draining possible oil that could be trapped because of centrifugal forces.

In an embodiment, portion 101 is outwardly defined by a bevel or chamfer 103 joined to surface 88 and tapered towards the above mentioned edge to perform a leading function when part 20 is fitted onto part 19 and, therefore, simplify the assembly operations of unit 1.

From the above, the advantages of the unit 1 claimed and described with reference to the accompanying drawings should be evident.

In particular, no additional contact sealing elements are used at the interface between surfaces 87, 88 so that friction, consequent wear and the overall number of components are reduced. In addition, as explained above in detail, recesses 91 are provided between the groove 90 and the edges 92, along the oil films defining the seal on the opposite sides of the groove 90, so as to generate a back pressure on the opposite axial sides of the groove 90. In this way, better operating conditions are provided to bear the part 20 during rotation of part 19 and therefore to limit the risks of contact between surfaces 87,88. In other words, a more stable behavior is reached for the oil films at the opposite sides of the groove 90.

Particular stable conditions are reached in the embodiments of FIGS. 7A and 7B, where pressurized oil is supplied into the recesses 91 trough the passages 94, so that the oil housed in the recesses 91 has a higher pressure. In this case, the recesses 91 perform the function of a hydrostatic bearing between parts 20 and 19 during rotation of the part 19.

It is apparent from the above features and considerations that modifications or variants may be made to unit 1 without departing from the scope of protection as defined by the appended claims.

In particular, as mentioned above, unit 1 can be mounted to frame 26 and/or carrier 4 differently from what described above and/or can be used in applications different from epicyclic transmissions. Perhaps, in other applications, part 19 can have a sliding movement in addition to the rotational one, with respect to part 18. Besides, unit 1 could be even used to transfer oil from the rotating part 20 to the stationary part 18.

Furthermore, shape, number and/or configuration of the passages and conduits between the mouth 29 and the outlets could be different from what described with reference with the attached drawings.

The invention claimed is:

1. An oil transfer unit comprising:
a stationary part comprising an oil mouth;
a rotating part having an inner chamber and an outer cylindrical surface extending along an axis;
a floating part having a cylindrical surface, the cylindrical surface of the floating part corresponding to the outer cylindrical surface with a radial gap therebetween defining a non-contact configuration, and the floating part having opposed axial ends with opposing edges;
the floating part being positioned about said axis and connected to said stationary part with a defined freedom of movement with respect to the stationary part;
an annular groove defined by said rotating part and said floating part and in permanent fluid communication with said oil mouth and with said inner chamber; said radial gap defining, in use, an oil film sealing located on each side of said groove; and
a plurality of recesses, which are delimited outwardly by said floating part and inwardly by said rotating part, are arranged on opposite axial sides of and remote from said groove so as to locally enlarge the radial distance between said floating part and said rotating part and are inwardly closed by said rotating part.

2. The oil transfer unit according to claim 1, wherein said recesses are axially spaced apart from said groove and from said edges.

3. The oil transfer unit according to claim 1, wherein said recesses are symmetric with respect to a mid-plane of said groove.

4. The oil transfer unit according to claim 3, wherein said recesses are aligned along two annular rows, each arranged on a corresponding side of said groove.

5. The oil transfer unit according to claim 1, wherein, on each side of said groove, said recesses are spaced apart from each other.

6. The oil transfer unit according to claim 5, wherein, on each side of said groove, said recesses are angularly spaced apart from each other.

7. The oil transfer unit according to claim 1, wherein said recesses are radially defined outwardly by respective pockets made into said cylindrical surface and inwardly by said outer cylindrical surface.

8. The oil transfer unit according to claim 1, wherein said floating part has:
an annular channel in permanent fluid communication with said oil mouth;
at least one radial hole, that puts said channel in permanent fluid communication with said groove;

a plurality of passages, that put said channel in permanent fluid communication with said recesses and are distinct from said at least one radial hole.

9. The oil transfer unit according to claim 8, wherein said recesses comprise respective arc portions, elongated along a circumferential direction about said axis, and respective axial branches, which axially extend from said arc portions towards said groove; said passages being defined by further radial holes.

10. The oil transfer unit according to claim 8, wherein said recesses comprise respective arc portions, elongated along a circumferential direction about said axis, and respective recesses, made on an axial side of the arc portions towards said groove; said passages being defined by holes inclined with respect to radial and axial directions.

11. An oil transfer unit comprising:
a stationary part comprising an oil mouth;
a rotating part having an inner chamber and an outer cylindrical surface extending along an axis;
a floating part having a cylindrical surface, the cylindrical surface of the floating part corresponding to the outer cylindrical surface with a radial gap therebetween defining a non-contact configuration, and the floating part having opposed axial ends with opposing edges;
the floating part being positioned about said axis and connected to said stationary part with a defined freedom of movement with respect to the stationary part;
an annular groove defined by said rotating part and said floating part and in permanent fluid communication with said oil mouth and with said inner chamber; said radial gap defining, in use, an oil film sealing located on each side of said groove; and
a plurality of recesses, which are delimited outwardly by said floating part and inwardly by said rotating part, are arranged on opposite axial sides of said groove so as to locally enlarge the radial distance between said floating part and said rotating part and are inwardly closed by said rotating part;
wherein said floating part has:
an annular channel in permanent fluid communication with said oil mouth;
at least one radial hole, that puts said channel in permanent fluid communication with said groove; and
a plurality of passages, that put said channel in permanent fluid communication with said recesses and are distinct from said at least one radial hole; and
wherein said recesses comprise respective arc portions, elongated along a circumferential direction about said axis, and respective recesses, made on an axial side of the arc portions towards said groove; said passages being defined by holes inclined with respect to radial and axial directions.

12. The oil transfer unit according to claim 11, wherein said recesses are axially spaced apart from said groove and from said edges.

13. The oil transfer unit according to claim 11, wherein said recesses are symmetric with respect to a mid-plane of said groove.

14. The oil transfer unit according to claim 13, wherein said recesses are aligned along two annular rows, each arranged on a corresponding side of said groove.

15. The oil transfer unit according to claim 11, wherein, on each side of said groove, said recesses are spaced apart from each other.

16. The oil transfer unit according to claim 15, wherein, on each side of said groove, said recesses are angularly spaced apart from each other.

17. The oil transfer unit according to claim 11, wherein said recesses are radially defined outwardly by respective pockets made into said cylindrical surface and inwardly by said outer cylindrical surface.

18. The oil transfer unit according to claim 11, wherein said recesses are axially spaced apart from said edges.

19. The oil transfer unit according to claim 11, wherein said recesses are radially defined outwardly by respective pockets made into said cylindrical surface.

20. The oil transfer unit according to claim 11, wherein said recesses are radially defined inwardly by said outer cylindrical surface.

* * * * *